United States Patent [19]

Ritch

[11] Patent Number: 6,091,218
[45] Date of Patent: Jul. 18, 2000

[54] ENERGY CONSERVATION CIRCUIT AND METHOD FOR USE WITH MULTI-PHASE MOTORS USED TO POWER A VARIABLE LOAD

[76] Inventor: Harold D. Ritch, 9313 S. Choctaw, Baton Rouge, La. 70815

[21] Appl. No.: 09/186,023

[22] Filed: Nov. 4, 1998

[51] Int. Cl.[7] .................................. H02P 5/28; F24F 7/00
[52] U.S. Cl. ........................... 318/438; 318/434; 165/16; 62/180; 236/49
[58] Field of Search ..................................... 318/254, 245, 318/637, 438, 721, 722, 798–832; 324/140 A, 545, 140 B, 140 D; 62/129, 127, 228.4, 230, 126, 208, 209, 187, 382, 441, 89, 97, 180; 165/16; 236/49

[56] References Cited

U.S. PATENT DOCUMENTS

| 3,744,267 | 7/1973 | Norbeck ..................................... 62/193 |
| 4,379,484 | 4/1983 | Lom et al. ................................. 165/16 |
| 4,723,104 | 2/1988 | Rohatyn .................................... 318/813 |
| 4,732,009 | 3/1988 | Frohbieter .................................... 62/89 |
| 5,493,868 | 2/1996 | Kikuiri et al. ............................. 62/129 |
| 5,502,365 | 3/1996 | Nanbu et al. ............................. 318/798 |
| 5,604,672 | 2/1997 | Yoshida et al. ............................ 363/97 |
| 5,659,232 | 8/1997 | Benning .................................... 318/438 |
| 5,739,650 | 4/1998 | Kimura et al. ........................... 318/254 |

*Primary Examiner*—Paul Ip
*Attorney, Agent, or Firm*—Henderson & Sturm LLP

[57] ABSTRACT

An energy conserving apparatus and method are disclosed. The apparatus is used for conserving power supplied to a multi-phase motor used to power a compressor having a high pressure output line. The motor has a plurality of voltage input lines for connection to receive a multi-phase input voltage. The apparatus includes a monitor for connection to monitor a parameter of the high pressure output line. A plurality of voltage limiting circuits in respective ones of the voltage input lines limit a voltage on the input lines to below selectable voltage levels in response to a control signal. A control circuit is connected to the monitor. The control circuit has a plurality of discrete programmed output levels to provide the control signal to the voltage limiting circuits. Each output level corresponds to a range of the parameter values of the high pressure output line, whereby the voltage limiting circuits limit the input voltage in discrete increments in relation to the parameter values in said high pressure output line. The monitored parameter in the case of a gas/fluid compressor may be a pressure or a temperature in the high pressure output line. The control circuit controls the timing for transitions between discrete voltage levels.

22 Claims, 5 Drawing Sheets

|  | % APPLIED | BASED ON 240V PEAK V | VOLTS @ FINAL OUTPUT | VOLTAGE PEAK | FINAL AVERAGE WORKING VOLTAGE |
|---|---|---|---|---|---|
| Group 1 | | | | | |
| | 5% | 12 | 240 | 228 | 159.6 |
| | 11% | 25.08 | 228 | 208.92 | 146.244 |
| | 12% | 24.96 | 208.92 | 183.04 | 128.128 |
| | 5% | 9.15 | 183.04 | 173.89 | 121.723 |
| | | | | | 0 |
| Group 2 | | | | | 0 |
| | 8% | 14.4 | 240 | 225.6 | 157.92 |
| | 12% | 27.07 | 225.6 | 198.53 | 138.971 |
| | 14% | 27.79 | 198.83 | 170.75 | 119.525 |
| | 6% | 10.24 | 170.75 | 160.51 | 112.357 |
| | | | | | 0 |
| Group 3 | | | | | 0 |
| | 10% | 24 | 240 | 216 | 151.2 |
| | 16% | 34/56 | 216 | 181.44 | 127.008 |
| | 17% | 30.84 | 181.44 | 150.59 | 105.413 |
| | 6% | 12/04 | 150.59 | 138.54 | 96.978 |
| | | | | | 0 |
| Group 4 | | | | | 0 |
| | 12% | 28.8 | 240 | 211.2 | 147.84 |
| | 20% | 42.24 | 211.2 | 168.69 | 118.083 |
| | 21% | 3548 | 168.69 | 133.2 | 93.24 |
| | 10% | 13.3 | 133.2 | 119.9 | 83.93 |

FIG. 9

ENERGY CONSERVATION CIRCUIT AND METHOD FOR USE WITH MULTI-PHASE MOTORS USED TO POWER A VARIABLE LOAD

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to improvements in energy saving devices and methods for use in polyphase electrical systems, and more particularly to improvements in methods and devices for controlling the power delivered to a polyphase motor in a system including variable mechanical load, such as a gas/fluid compressor of the type used in air conditioning systems, or the like.

2. Description of the Related Art

In the past, many energy saving devices have been proposed for use in electrical systems which include a motor. Many popular commercial power saver devices are used to save energy in home appliances, such as refrigerators or freezers in which an electric motor is operated with electrical power by conditioning the power from that supplied by a standard commercial power supply.

Typically, such devices rely upon one or more voltage waveform "voltage chopper," of the type in which portions of a voltage waveform are extinguished during certain portions of a voltage cycle. In the context of an ac voltage waveform, this results in the voltage waveform existing only during portions of each individual alternating cycle, with the voltage value being held at zero during the remaining cycle portions.

Although many such energy saving systems have been proposed for single phase motors, in the context of multi-phase motor systems, to which the present invention pertains, most single phase units cannot feasiblely be used. Most such single phase units achieve their power saving functions by constantly correcting the phase between the supplied voltage and current, thereby increasing the overall power factor to make the system more efficient. This technique is not simply applied in the implementation of such power saving devices used for multi-phase systems.

One of the problems of such multi-phase systems that is often encountered, however, which makes the application of energy saving devices difficult, is that the mechanical loads on the driving motor may vary, and such load variations are generally not considered in providing an appropriate level of power to the motor. For example, in an air conditioning compressor of the type that compresses a hot gas, such as gaseous Freon, to exchange the heat therein during the formation of a fluid Freon, initially at start-up, a much larger power is required than is required after the compressor reaches its steady-state operation. Nevertheless, energy saving devices generally still apply a constant voltage to the motor.

In addition, on startup, multi-phase motors usually include start-up windings that are initially energized, but which are removed from the circuit once the motor has reached its normal running speed. Thus, at normal running speeds, a lesser amount of power may be sufficient to sustain the operation of the motor. Nevertheless, many energy saving devices and techniques apply full power to the motor during startup, and continue to provide full power to the motor after it has reached normal running speed. Continuing to apply full power to the motor under such circumstances is wasteful and unnecessary.

Moreover, in prior devices and techniques in which constantly changing voltage, current, or power factor control is provided, a hysteresis effect occurs due to the demands of the load. This reduces the potential efficiency savings that might otherwise be achieved. Thus, although such power savings devices and techniques may be useful in systems in which the load on the motor is relatively constant, they are not well suited for achieving energy savings in systems in which the load on the motor varies, such as, again, for example, in air conditioner compressors, or the like.

What is needed, therefore, is an energy conserving device and technique that can be used in conjunction with multi-phase motors that may have varying power needs used to drive loads which may provide varying loads to the motor.

Those concerned with these and other problems recognize the need for an improved energy conservation circuit and method for use with multi-phase motors used to power a variable load, or the like.

BRIEF SUMMARY OF THE INVENTION

In light of the above, therefore, it is an object of the invention to provide an improved energy conserving device and technique.

It is another object of the invention to provide an energy conserving method and technique that can be used in conjunction with multi-phase motors, which may have varying power needs, and/or which may be used to drive variable loads.

It is another object of the invention to provide an energy conserving method and technique of the type described that provides voltage peak clipping based upon a load to the motor to control the power delivered to the motor to discrete voltage levels.

It is another object of the invention to provide an energy conserving method and technique of the type described that may be installed by a system user, for example, by an after-sale product that can be easily installed and used to control the power delivered to the motor in the manner herein described.

These and other objects features and advantages of the invention will be apparent to those skilled in the art from the following detailed description of the invention, when read in conjunction with the accompanying drawings and appended claims.

Thus, according to a broad aspect of the invention, an apparatus is provide for conserving power supplied to a multi-phase motor, such as a three-phase motor. The motor is used to power a load which may vary mechanically. The load has a load line from which a load parameter may be derived. The load may be, for example, a compressor having a high pressure output line. In an embodiment in which the load is a compressor, the load line may be a high pressure output line of the compressor.

The motor has a plurality of voltage input lines for connection to receive a multi-phase input voltage. A monitor is provided for connection to monitor a parameter of the load line, such as its temperature or pressure. A plurality of voltage limiting circuits, which may be, for example, a plurality of triacs, are connected in respective voltage input lines. The voltage limiting circuits instantaneously limit a voltage on the input lines to below selectable voltage levels in response to a control signal. The control signal is generated by a control circuit, which is connected to the monitor. The control circuit has a plurality of discrete programmed output levels to provide the control signal to the voltage limiting circuits. Each output level corresponds to a range of the parameter values of the high pressure output line. The control circuit may, for example, include a programmed EEPROM to determine the various discrete voltage limits. the voltage limiting circuit therefore limits the input voltage in discrete increments, for instance in four increments, in relation to the parameter values in the high pressure output line.

According to another broad aspect of the invention, an apparatus is provided for conserving power supplied to a multi-phase motor, which typically may be a three-phase motor, having a plurality of input lines for connection to respective power lines of a multi-phase voltage source. The motor may be connected to power a compressor having a high pressure output line. A monitor is adapted for connection to monitor levels of a parameter of the high pressure output line, such as a pressure in the line, a temperature in the line, or some other parameter that may be related to the magnitude of the load. A plurality of triacs are each connected in a respective one of the power input lines to selectively control at least one voltage limit in each of the input lines.

A control circuit is connected to the monitor. The control circuit has a plurality of discrete output voltage levels, each corresponding to a respective range of levels of the parameter of the high pressure output line which is being monitored. In one embodiment, four discrete levels are provided, each corresponding to a respective magnitude range of the parameter that is being monitored in the high pressure output line. The four discrete levels may be, for instance, discrete output voltage levels corresponding to voltage limit levels of 100%, 90.7%, 59.5%, and 52.1% of a peak voltage level, or of some other desired discrete levels. It should be understood that other numbers of discrete levels will also work. For example, in several preferred embodiments five discrete levels are utilized. The control circuit may include an EEPROM programmed to output a signal specifying respective ones of the plurality of ranges in the high pressure output line, and further comprising a circuit to provide a control voltage output to the triacs in response to the signal. Thus, as parameter levels in the high pressure output line fall, the output voltage levels of the control circuit cause the triacs to provide incremental increasing voltage limiting levels to a voltage of the multi-phase voltage source. The control circuit may, for example, include a diac connected to control the triacs.

According to yet another broad aspect of the invention, a method is presented for conserving power used by a compressor system powered by a multi-phase motor having input lines for connection to respective input lines of a multi-phase voltage source. The compressor system is of the type having a compressor having a high pressure output line. The method includes monitoring a parameter in the high pressure output line, and instantaneously limiting a voltage level in each of the input lines to a selected one of a plurality of discrete voltage levels in direct relation to respective ranges of levels of the monitored parameter. The instantaneously limiting a voltage level in each of the input lines may include instantaneously limiting the voltage level in each of the input lines to a selected one of four discrete voltage levels, for instance, one of 100%, 90.7%, 59.5%, and 52.1% of a peak voltage level. The monitoring a parameter in the high pressure output line may include monitoring a pressure, a temperature, or other load magnitude indicating parameter in the high pressure output line.

In still other embodiments of the present invention, other discrete voltage levels are used. The optimal voltage levels to use can vary greatly and depend not only on the type of load used in the system but also on the brand and model of the load. Likewise, the transition points, i.e. when to move to the next discrete voltage level, can vary depending on the type, brand and model of the load. While a universal set of discrete voltage levels and transition points would most likely result in an energy saving in most systems, customizing the discrete voltage levels and transition points will result in the most efficient operation of the load.

Important to all embodiments of the present invention is the timing of the transitions between each discrete voltage level. The present invention requires that the system operate for at least a predefined interval before shifting to the next lower discrete voltage level. This prevents the system from shifting down too quickly. However, the system can shift upwards, even skipping several levels, toward a higher voltage level without any delay. Therefore, the system can respond immediately to a sudden increase in load demand.

BRIEF DESCRIPTION OF THE SEVERAL VIEWS OF THE DRAWINGS

The invention is shown in the accompanying drawings, in which:

FIG. 9 is a table of operation data corresponding to the operation of the present invention as represented in FIGS. 5–8.

In the various figures of the drawing, like reference numerals are used to denote like or similar parts.

DETAILED DESCRIPTION OF THE INVENTION

Figure 1:
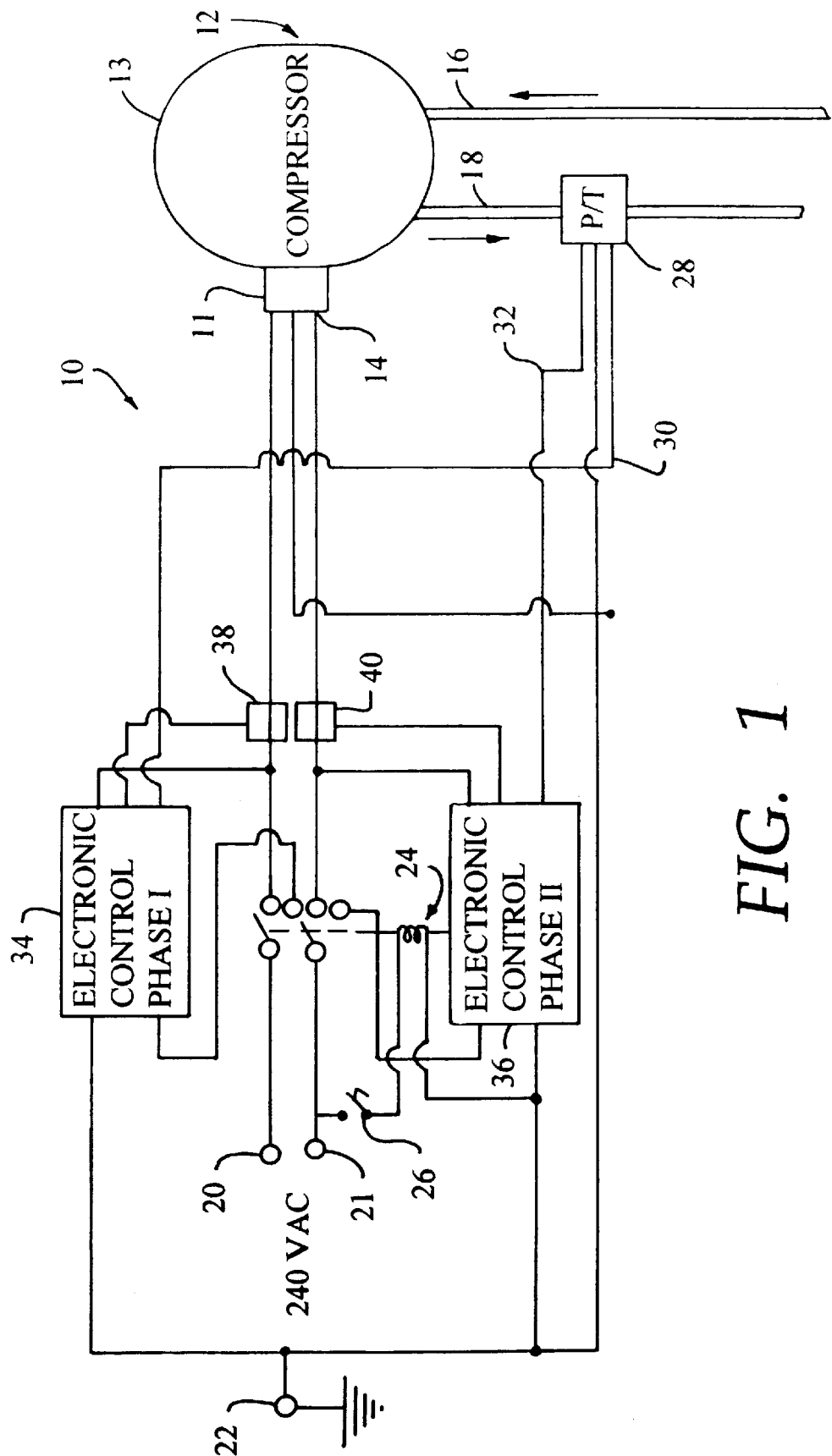
FIG. 1 is a generalized block diagram of a circuit providing energy efficiency to a three-phase motor driving a compressor, such as might be used in an air conditioning system or the like, according to a preferred embodiment of the invention.

A generalized block diagram of a energy conserving system (10) is shown in FIG. 1 The system (10) includes a compressor system (12) of the type used in air conditioning systems, or the like. The compressor system (12) may be of the type having multiphase electrical input connections (14), by which electrical power is supplied to a three-phase motor (11) that drives compressor (13) having input and output lines (16) and (18) through which a compressible refrigerant fluid, such as Freon, a Freon substitute, or the like, is conducted. As known, typically the refrigerant is returned after a heat exchange operation to the compressor (13) where it is compressed, generally, changing its state to a liquid, and returned to the heat exchanger (not shown) via the output line (18). Compressor systems and their operation, such as that of the compressor system (12), are well known.

It should be noted that although a compressor of the type used in air conditioning or refrigerating units is described in the preferred embodiment herein, it should be understood that other multiphase loads may also be used in conjunction with the power saving circuitry of the present invention.

Three-phase power is applied on input terminals (20), (21), and (22) to the power input terminals of the motor (11), for example, at 240 volts AC. As shown, typically, one of the terminals, such as terminal (22), is neutral or ground to which the voltage applied to the other two terminals (20) and (21) is referenced. Thus, typically, the input voltage is applied in three phases, each displaced 120 degrees from the other respectively, between input terminals (20) and (21), (21) and (22) and (20).

A multiple pole relay or contact (24) is connected between one of the power input lines (21) and ground (22), which is activated by a user operated switch (26) to switch the contacts of the relay from the normally open position to a first closed position, to apply full power to the input terminals (14) of the motor (11).

A multiple pole relay or contact (24) is connected between one of the power input lines (21) and ground (22), which is activated by a user operated switch (26) to switch the contacts of the relay from the normally open position to a first closed position, to apply full power to the input terminals (14) of the motor (11).

A sensor (28) is located adjacent to or within the fluid output line (18) of the compressor (13) to measure a parameter of the output line (18). For example, the sensor (28) may be a temperature sensor to measure the temperature of the refrigerant in the output line (18), thereby providing an indication of the overall state of the system with which the compressor (13) is associated. The temperature also reflects the load that is seen by the compressor system. More particularly, as the temperature becomes colder, it can be assumed that the overall efficiency of the compressor system is increasing and/or that the load on the system is decreasing.

Alternatively, the sensor (28) may be a pressure sensor to sense the pressure within the output line (18). This also provides an indication of the overall efficiency and load upon the compressor system. Thus, the lower the pressure, the less the load that is seen within the compressor system.

The output lines (30) and (32) from the pressure sensor (28) are connected to respective electronic control circuits (34) and (36), which serve to clip the voltage applied at the input terminals (20)–(22) to the motor (11) as the load on the compressor system decreases. The manner by which the electronic control circuits (34) and (36) operate is described in detail below.

In operation, when the efficiency of the compressor systems is sensed by the sensor (28) to decrease from, for example, startup, initial cooling, or other heavy load conditions, the electronic control circuits (34) and (36) sense the decrease load and activate the relay (24) to switch the control circuitry of the electronic control circuits (34) and (36) in series with the lines between the input terminals (20) and (21) and the input terminals (14) of the motor (11). As will become apparent, the electronic control circuits (34) and (36) serve to clip the voltage peaks of the input voltage applied to the input terminals (20)–(22) in discrete stages, depending upon the load applied to the compressor system.

The initial point at which the electronic clipping control circuit of the electronic control circuits (34) and (36) is connected into the input line may be detected by respective "CT sensors" (38) and (40) on the power input lines, as shown. Thus, for example, as the input current is sensed to be decreasing to below a certain input level, the electronic clipping circuits are connected in series with the input lines to the motor (11).

Figure 2:
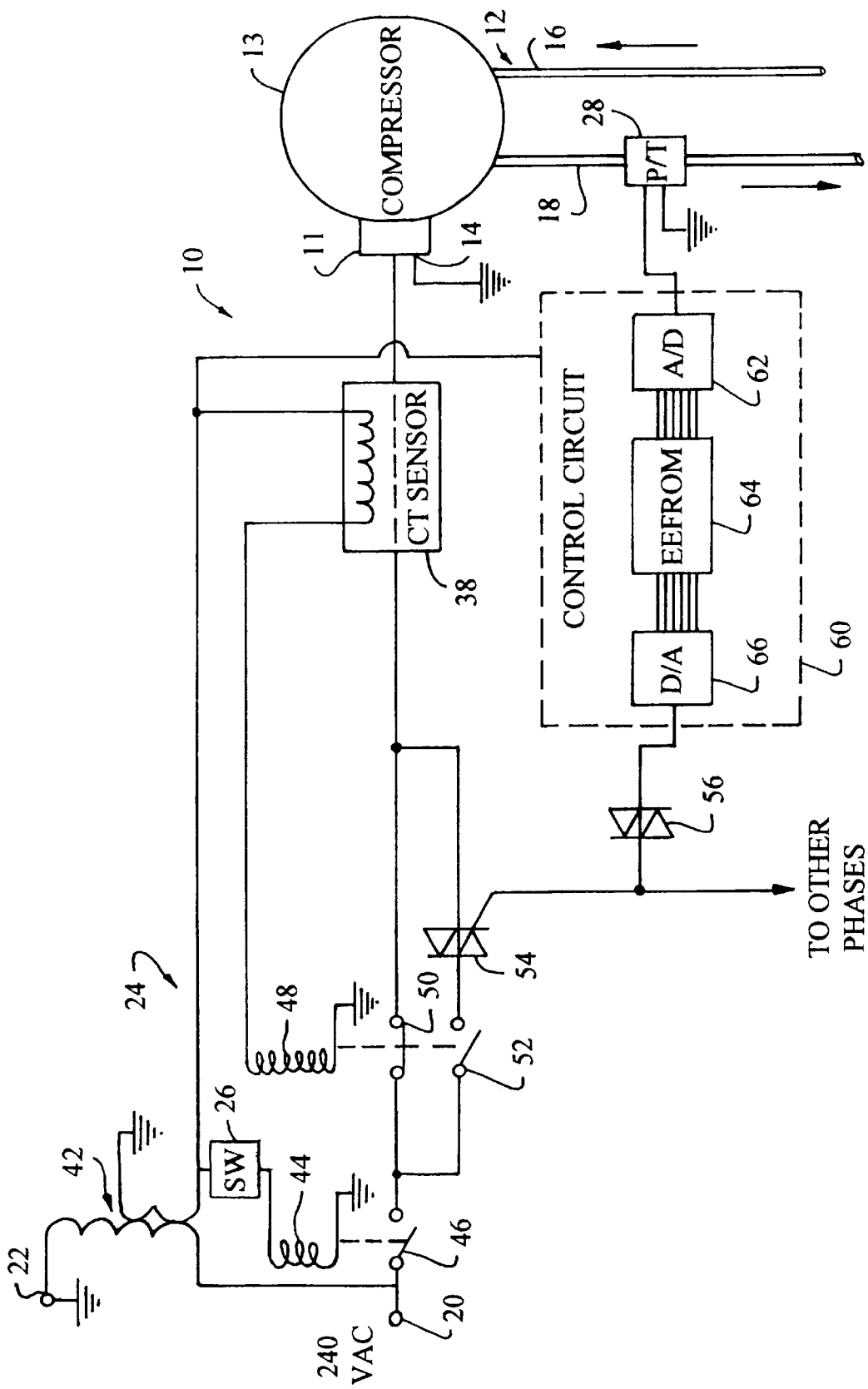
FIG. 2 is a more detailed electrical schematic diagram of a circuit for providing energy efficiency to a three-phase motor driving a compressor, such as might be used in an air conditioning system, or the like, according to a preferred embodiment of the invention.

The circuit (10) is shown in greater detail in the schematic of FIG. 2, which depicts a circuitry controlling one phase of the input power to the input terminals (14) of the compressor system (12). Similar circuitry would be employed in the control of the other phases of the load. It should be noted that in order to prevent imbalances between the phases of the compressor, the values of the components of the circuitry used to control each phase should be matched as closely as possible.

As shown, a step down transformer (42) is provided to reduce the actuating voltage applied to the coils of the relay (24). A first portion of the relay (24) includes a coil (44) which closes a normally open contact (46) when a user actuated switch (26) is closed, thereby applying power directly to the input terminals (14) of the motor (11). The second part of the relay (24) includes a coil (48), which controls the normally closed relay contact (50) and normally open relay contact (52). It should be noted that the relay (24) may include two separate relays, one including the coil (44), the other including the coil (48).

The "CT sensor" (38) is connected to sense a parameter of the input line to the motor (11), for example, a current magnitude therein. The CT sensor, therefore, may be of the type in which a coil or other current detecting element is placed in proximity to the power line to sense the magnitude of the current flowing therein. When the CT sensor (38) senses that the current has fallen to below a predetermined threshold voltage, indicating that the initial start-up compressor phase has been completed, the voltage applied to the coil (48) allows the normally closed relay contact (50) to open and the normally open relay contact (52) to close. This places a triac (54) in series with the power input line between the input terminal (20) and the terminals (14) of the motor (11).

The current conduction through the triac (54) is controlled by a diac (56), which receives its control signal from a control circuit (60). The control circuit (60) is connected to the parameter sensor (28) which, as described above, detects the load experienced by the compressor system (12). The control circuit (60) includes circuitry for presenting staged voltages to the diac (56), depending on the temperature or pressure level sensed by the sensor (28), which in turn depends upon the load applied to the compressor.

The control circuit (60) is designed to detect the analog output of he sensor (28) and in response to produce various biasing levels to the diac (56) to define discrete operating stages of the energy conserving circuit (10). The control circuit may be constructed, as shown, with an initial digital-to-analog converter (62) for providing digital addressing signals to an EEPROM (64). The EEPROM (65) is programmed to provide in response to various addressing ranges digital output data that will be translated into discrete biasing levels to the diac (56). The output signals from the EEPROM (64) are translated back into an analog signal by a digital-to-analog converter (66), the output of which is connected as the input to the diac (56). Thus, as the bias on the diac (54) is changed in discrete increments, the triac (54) is operated to clip the voltage waveform of the applied signal to the motor (11) in discrete stages.

It should be noted that as used herein, the term "clipping," is used to denote a voltage limiting function in which a selected peak voltage is selectively determined or established. In the context of an ac voltage waveform, this results in the peaks of the voltage waveform being limited to below the selected voltage limit. This is in distinction to the use of the word "voltage clipping," which may be sometimes used to refer to an operation in which portions of a voltage waveform are extinguished for portions of a voltage cycle (i.e. "voltage chopping"). In the context of an ac voltage waveform, chopping results in the voltage waveform existing only during portions of each individual alternating cycle, with the voltage value being held at zero during the remaining portions of the voltage cycle. Of course, the voltage clipping occurs during both positive and negative voltage excursions in both uses of the term.

Also, it should be noted that although an EEPROM circuit is shown for generating the various discrete biasing levels to the diac/triac control circuitry, other circuitry can be equally advantageously employed. For example, a microprocessor control circuit, appropriate CMOS circuitry, or other known means can be employed. Moreover, since different compressor systems may require different drive levels to achieve the general objects of the invention, some experimentation may be required for each particular compressor system. For such experimentation, a so-called "Stamp" chip available from Parallax, Inc. may be used in place of the EEPROM circuitry with appropriate PC programming to derive the required or desired discrete control signal levels.

As noted, the power to the motor (11) is controlled to be within one of 4 discrete "stages." Although the number of discrete stages may be increased or decreased (although it is believed that an infinite number of stages would be counter-productive and difficult to control), 4 is preferred. The peak voltage values of each stage also may vary, depending upon the particular system with which the power saving device is employed, it is believed that in most cases values of 100%, 70.7%, 59.5%, and 52.1% of the peak value may be preferably used. It should be noted that the lowermost value should be selected to be large enough so that the motor with which the system is being used does not stall or stop. The upper stage value at which clipping actually occurs (i.e., the stage immediately below 100% power) typically would be the appropriate power level immediately after energization of the start-up windings has been discontinued.

Figure 3:
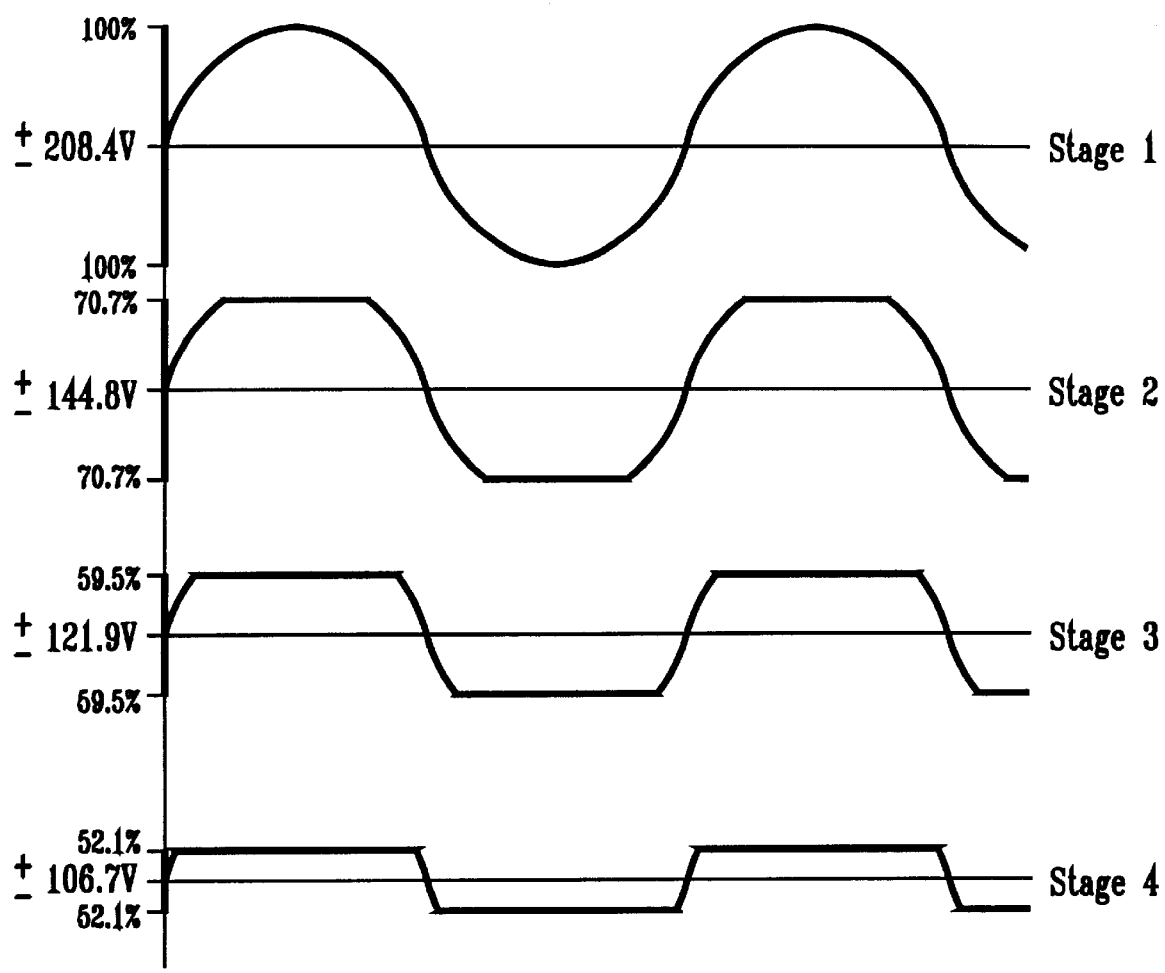
FIG. 3 shows graphs of voltage versus time showing the voltage clipping or regulating operation of the circuit of FIG. 2 in discrete voltage increments.

Typical waveforms for a discrete clipping levels of a preferred embodiment of the invention are shown in FIG. 3, defining states 2 through 4. State 1 is defined as shown in the upper wave form labeled "stage 1" to be 100% of the input power being passed to the input terminals (14) of the motor (11). Thus, for example, in stage 1, initially at startup, or until an initial reduced load level has been achieved, full power is applied to the motor (11). When the parameter sensor (28) detects that the load on the compressor system (12) has decreased to a first predetermined level, the control circuit (60) determines that the system should operate at the "stage 2" level, as shown by the wave form denoted "stage 2", to which operation is then switched. The stage 2 level is defined by the clipping level applied to the input voltage by the triac (54), and, for example, may be at 70.7% of the peak voltage.

As the load is further reduced, as sensed by the parameter sensor (28), the efficiency circuit (10) is operated in a third stage, as designated by the curve "stage 3" in FIG. 3. The peak clipping level of the stage 3 operation may be, for example, 59.5% of the peak voltage of the full power level of the stage 1 operation. Finally, as the load is further reduced, as sensed by the parameter (28), a fourth stage of operation is entered, as shown by the curve designated "stage 4" in FIG. 3. The clipping level in the stage 4 operation of the circuit may be, for example, 52.1% of the full power or stage 1 voltage level. If the load is further reduced, typically, the voltage would not be reduced below the stage 4 level to ensure that a sufficient voltage is applied to the motor (11) to ensure its proper continued operation. Of course, if the load were to be increased for some reason, the progression of stages from 1 to 4 can be reversed, returning, if necessary, in stages to the full power application afforded in stage 1.

Figure 4:
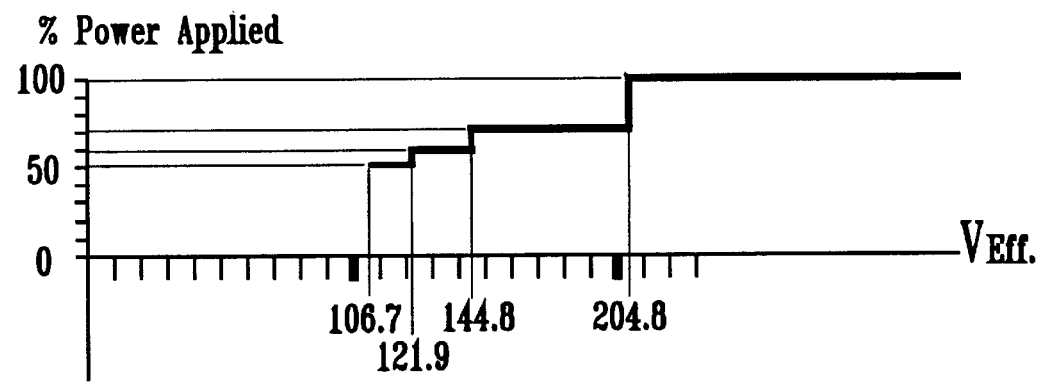
FIG. 4 is a graph showing the percent of power applied at each of the four discrete operating stages in operation of a preferred embodiment of the power saving device of the invention.

Thus, as shown in FIG. 4, the percent of the peak applied power has a function of the effective voltage applied to the input terminals (14) of the motor (11) is shown. It can be seen as the effective voltage that is applied to the motor (11) is reduced, the percentage of power is decreased in discrete steps. This is in contrast to prior systems, which typically chopped the input voltage at various continuous voltage levels, but which resulted in the input power being periodically completely discontinued from application to the compressor.

In all embodiments of the present invention the timing of the transitions between each discrete voltage level is important. The energy conservation system of present invention requires that the system operate for at least a predefined interval before shifting to the next lower discrete voltage level. This prevents the system from shifting down too quickly. However, the system can shift upwards, even skipping several levels, toward a higher voltage level without any delay. Thus, the system can respond immediately to a sudden increase in load demand.

In operation, the system will begin in at the maximum or peak voltage level. It will remain at the peak voltage level for at least as long as the predefined time interval, only after the predefined time has passed will it ever shift down to the next discrete voltage level. After it shifts down to a lower voltage level, it must again operate at that voltage level for at least as long as the predefined time interval. This process continues until the system is at the lowest level or until the system reaches a certain level at which it must remain to satisfy the load demand. When a sudden need for a higher voltage level is present, the system immediately responds by operating at a higher voltage level, often the peak level. The system does not require and delay before operating at peak power.

Figure 5:
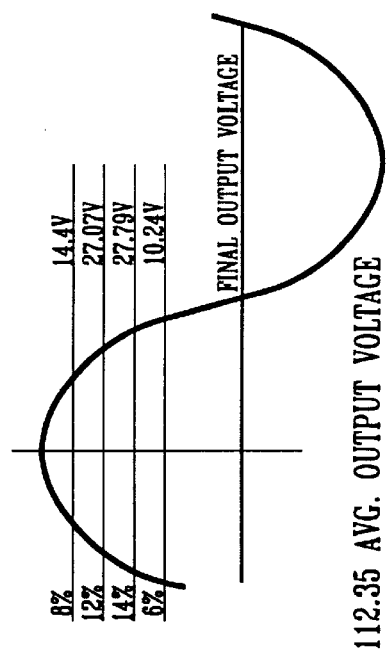
FIG. 5 is a graph showing representative voltage clipping levels for another embodiment of the present invention.

Referring now to FIGS. 5–9, alternative embodiments to the present invention are shown. The system in each of these embodiments function in a similar fashion to the energy conserving system (10) described above with the exception that these systems utilize five discrete voltage level where the above described system only utilized four. Referring to FIG. 5, the system in this embodiment has a first discrete level which is peak voltage value. The second discrete level drops 5% to approximately 95% of the peak voltage. The third discrete voltage level drops an additional 11% to approximately 84% of peak voltage. The fourth discrete voltage drops an additional 12% to approximately 72% of peak voltage. The fifth discrete voltage drops an additional 5% to approximately 67% of peak voltage. The average voltage output in this embodiment id approximately 120 volts.

Figure 6:
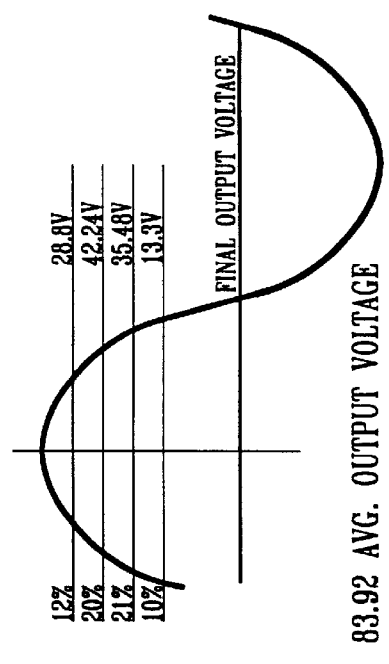
FIG. 6 is a graph showing representative voltage clipping levels for still another embodiment of the present invention.

Referring to FIG. 6, the system in this embodiment has a first discrete level which is peak voltage value. The second discrete level drops 8% to approximately 92% of the peak voltage. The third discrete voltage level drops an additional 12% to approximately 80% of peak voltage. The fourth discrete voltage drops an additional 14% to approximately 66% of peak voltage. The fifth discrete voltage drops an additional 6% to approximately 60% of peak voltage. The average voltage output in this embodiment id approximately 112 volts.

Figure 7:
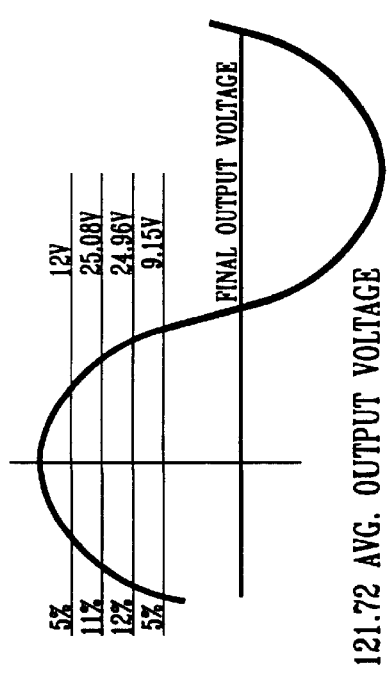
FIG. 7 is a graph showing representative voltage clipping levels for yet another embodiment of the present invention.
Figure 8:
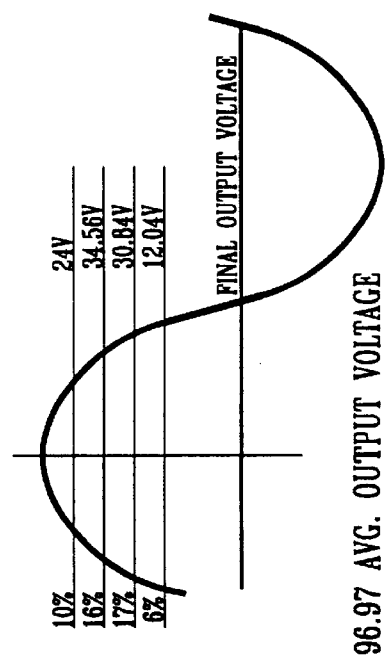
FIG. 8 is a graph showing representative voltage clipping levels for still another embodiment of the present invention.

Referring to FIG. 7, the system in this embodiment has a first discrete level which is peak voltage value. The second discrete level drops 10% to approximately 90% of the peak voltage. The third discrete voltage level drops an additional 16% to approximately 74% of peak voltage. The fourth discrete voltage drops an additional 17% to approximately 57% of peak voltage. The fifth discrete voltage drops an additional 6% to approximately 51% of peak voltage. The average voltage output in this embodiment id approximately 97 volts.

Referring to FIG. 5, the system in this embodiment has a first discrete level which is peak voltage value. The second discrete level drops 12% to approximately 88% of the peak voltage. The third discrete voltage level drops an additional 20% to approximately 68% of peak voltage. The fourth discrete voltage drops an additional 21% to approximately 47% of peak voltage. The fifth discrete voltage drops an additional 10% to approximately 37% of peak voltage. The average voltage output in this embodiment id approximately 84 volts.

Referring to FIG. 9, a table of operation data for the embodiments of FIGS. 5–8 is shown. Obviously the type of load, the brand and the model determine which discrete voltage levels will result in the most efficient operation. The greater the voltage drop, the great savings achieved. However, the particular characteristics and limitations of each load device determine the maximum practical drops.

Although the invention has been described and illustrated with a certain degree of particularity, it is understood that he present disclosure has been made only by way of example, and that numerous changes in the combination and arrangement of parts can be resorted to by those skilled in the art without departing from the spirit and scope of the invention, as hereinafter claimed.

What is claimed:

1. Apparatus for conserving power supplied to a multi-phase motor used to power a load which may vary, said load having a load line providing an indication of a magnitude of said load, said motor having a plurality of voltage input lines for connection to receive a multi-phase input voltage comprising:
    a monitor for connection to monitor a parameter of said load line;
    a plurality of voltage limiting circuits in respective ones of said voltage input lines, said voltage limiting circuits limiting a voltage on said input lines to below selectable voltage levels in response to a control signal; and
    a control circuit connected to said monitor having a plurality of discrete programmed output levels to provide the control signal to said voltage limiting circuits, each output level corresponding to a range of said parameter values of said load line, whereby said voltage limiting circuit limits the input voltage to the load to one of said selectable voltage levels corresponding to said parameter range monitored on said load output line.

2. The apparatus of claim 1 wherein said selectable voltage levels comprise a sequence of decreasing outputs levels based upon a proportion of the maximum load.

3. The apparatus of claim 2 where said control circuit maintains the voltage level at each level for a minimum time interval before advancing to the next lower voltage level.

4. The apparatus of claim 3 wherein said controller immediately switches to the appropriate higher level without stopping at intermediate levels upon sensing from the load line monitor that additional power is required.

5. The apparatus of claim 2 wherein said selectable voltage levels is four in number.

6. The apparatus of claim 5:
    wherein the first of said voltage levels is approximately 100% of the maximum voltage;
    wherein the second of said voltage levels is approximately 90% of the maximum voltage;
    wherein the third of said voltage levels is approximately 60% of the maximum voltage; and
    wherein the fourth of said voltage levels is approximately 52% of the maximum voltage.

7. The apparatus of claim 2 wherein said selectable voltage levels is five in number.

8. The apparatus of claim 5:
    wherein the first of said voltage levels is approximately 100% of the maximum voltage;
    wherein the second of said voltage levels is approximately in the range of 88% to 95% of the maximum voltage;
    wherein the third of said voltage levels is approximately in the range of 68% to 84% of the maximum voltage;
    wherein the fourth of said voltage levels is approximately in the range of 47% to 72% of the maximum voltage;
    wherein the fifth of said voltage levels is approximately in the range of 37% to 67% of the maximum voltage.

9. The apparatus of claim 5:
    wherein the first of said voltage levels is approximately 100% of the maximum voltage;
    wherein the second of said voltage levels is approximately in the range of 90% to 92% of the maximum voltage;
    wherein the third of said voltage levels is approximately in the range of 74% to 80% of the maximum voltage;
    wherein the fourth of said voltage levels is approximately in the range of 57% to 66% of the maximum voltage;
    wherein the fifth of said voltage levels is approximately in the range of 51% to 60% of the maximum voltage.

10. The apparatus of claim 5:
    wherein the first of said voltage levels is approximately 100% of the maximum voltage;
    wherein the second of said voltage levels is approximately 95% of the maximum voltage;
    wherein the third of said voltage levels is approximately 84% of the maximum voltage;
    wherein the fourth of said voltage levels is approximately 72% of the maximum voltage;
    wherein the fifth of said voltage levels is approximately 67% of the maximum voltage.

11. The apparatus of claim 5:
    wherein the first of said voltage levels is approximately 100% of the maximum voltage;

wherein the second of said voltage levels is approximately 92% of the maximum voltage;

wherein the third of said voltage levels is approximately 80% of the maximum voltage;

wherein the fourth of said voltage levels is approximately 66% of the maximum voltage;

wherein the fifth of said voltage levels is approximately 60% of the maximum voltage.

12. The apparatus of claim 5:

wherein the first of said voltage levels is approximately 100% of the maximum voltage;

wherein the second of said voltage levels is approximately 90% of the maximum voltage;

wherein the third of said voltage levels is approximately 74% of the maximum voltage;

wherein the fourth of said voltage levels is approximately 57% of the maximum voltage;

wherein the fifth of said voltage levels is approximately 51% of the maximum voltage.

13. The apparatus of claim 5:

wherein the first of said voltage levels is approximately 100% of the maximum voltage;

wherein the second of said voltage levels is approximately 88% of the maximum voltage;

wherein the third of said voltage levels is approximately 68% of the maximum voltage;

wherein the fourth of said voltage levels is approximately 47% of the maximum voltage;

wherein the fifth of said voltage levels is approximately 37% of the maximum voltage.

14. The apparatus of claim 1 wherein said load is a compressor and said load line is a high pressure output line.

15. The apparatus of claim 6 wherein said parameter of said high pressure output line is a pressure.

16. The apparatus of claim 6 wherein said parameter of said high pressure output line is a temperature.

17. A method for conserving power used by a compressor system powered by a multi-phase motor having input lines for connection to respective input lines of a multi-phase voltage source, said compressor system having a compressor having a high pressure output line, comprising:

monitoring a parameter in said high pressure output line; and limiting a voltage level applied the compressor to one of a plurality of discrete voltage levels, said plurality comprising a series of decreasing voltage levels, each of said voltage levels corresponding to respective ranges of levels of said monitored parameter.

18. The method of claim 17 including the step:

maintain the current voltage level for a predefined minimum time prior to advancing to the next lower voltage level.

19. The method of claim 18 including the step:

immediately switching to an appropriate high level upon determining from monitoring the high pressure line that additional power is required.

20. The method of claim 17 wherein said monitoring a parameter in said high pressure output line comprises monitoring a pressure in said high pressure output line.

21. The method of claim 17 wherein said monitoring a parameter in said high pressure output line comprises monitoring a temperature in said high pressure output line.

22. The method of claim 19 wherein said limiting a voltage level applied the compressor to one of a plurality of discrete voltage levels comprises limiting said voltage level to one of approximately 100%, approximately 70%, approximately 60%, and approximately 50% of the peak voltage.

* * * * *